United States Patent [19]

Rawicki

[11] 4,439,215
[45] * Mar. 27, 1984

[54] APPARATUS AND METHOD FOR EXTRACTING DUST FROM AIR

[76] Inventor: Bogdan J. Rawicki, 17, Stanwick Rd., London, W14 8TZ, England

[*] Notice: The portion of the term of this patent subsequent to Sep. 22, 1998 has been disclaimed.

[21] Appl. No.: 261,954

[22] Filed: May 8, 1981

Related U.S. Application Data

[63] Continuation of Ser. No. 65,837, Aug. 13, 1979, Pat. No. 4,290,784, which is a continuation of Ser. No. 964,195, Nov. 28, 1978, abandoned.

[30] Foreign Application Priority Data

Nov. 30, 1977 [GB] United Kingdom .............. 49873/77

[51] Int. Cl.³ .......................................... B01D 47/02
[52] U.S. Cl. .......................................... 55/95; 55/227; 55/228; 55/249; 55/256; 55/257 PV; 261/119 R; 261/123
[58] Field of Search ............... 55/90, 95, 227, 228, 55/244, 255, 247–249, 256, 257 R, 257 PV, 260; 261/119 R, 121 R, 123

[56] References Cited

U.S. PATENT DOCUMENTS

| | | | |
|---|---|---|---|
| 2,015,174 | 9/1935 | Anglemyer | 55/255 X |
| 2,719,032 | 9/1955 | Schnur | 55/256 X |
| 3,321,191 | 5/1967 | Najarian | 55/256 X |
| 3,624,696 | 11/1971 | Cohen et al. | 261/119 R X |
| 3,676,982 | 7/1972 | Price | 55/256 X |
| 3,690,039 | 9/1972 | Salemink | 55/260 X |
| 3,778,979 | 12/1973 | Friedling et al. | 261/119 R X |
| 3,980,458 | 9/1976 | Berthoud | 55/255 X |
| 4,038,347 | 7/1977 | Mickley | 261/119 R X |
| 4,290,784 | 9/1981 | Rawicki | 55/95 |

FOREIGN PATENT DOCUMENTS

| | | | |
|---|---|---|---|
| 136085 | 1/1950 | Australia | 55/256 |
| 843294 | 6/1939 | France | 55/247 |
| 1355908 | 6/1974 | United Kingdom | 55/255 |

Primary Examiner—Richard L. Chiesa
Attorney, Agent, or Firm—Birch, Stewart, Kolasch & Birch

[57] ABSTRACT

In a dust extraction method and apparatus, impeller means, such as a fan, draws dust-laden air through a water reservoir. Baffles cause the air to divert into sinuous undulating lateral paths through the water without significant turbulence. The air passed through the water is allowed to separate from lateral curtains of water and rises into a grid of plates which strip water from the air prior to its discharge.

20 Claims, 5 Drawing Figures

APPARATUS AND METHOD FOR EXTRACTING DUST FROM AIR

This application is a continuation of copending application Ser. No. 65,837, filed on Aug. 13, 1979, now U.S. Pat. No. 4,290,784 which, in turn, is a continuation of abandoned application Ser. No. 964,195 filed Nov. 28, 1978.

BACKGROUND OF THE INVENTION

The present invention relates in general to a dust control apparatus. More particularly, the invention relates to apparatus for collecting or extracting dust from air and to a method of collecting or extracting dust from air employing such apparatus. The apparatus with which this invention is concerned is particularly useful in underground mining installations, although the apparatus can be used in quarries or other industrial premises where air is prone to carry dust.

One form of known dust collection apparatus is described in my U.K. Pat. No. 1355908. In this known apparatus, dust-laden air is passed over the surface of water in a reservoir and air turbulence is deliberately created by baffles to generate water spray above the water surface. Large particles of dust pass directly into the water, while smaller particles are entrained in the turbulent air and are removed subsequently. The present invention seeks to improve the previously known apparatus.

SUMMARY OF THE INVENTION

In accordance with the present invention, the apparatus comprises an air inlet means adapted to receive air carrying dust therein, air outlet means for discharging the air after cleansing, a water reservoir, means for directing the air from the inlet means towards the water reservoir and baffle means for constraining the air which passes through the water in the reservoir in at least one sinuous or tortuous path. Preferably, stripping means is provided above the water reservoir for stripping residual water from the air emerging from the reservoir and baffle means, the water being returned back to the reservoir.

In contrast to the previously known apparatus of this type, there is no significant turbulence in the air as it passes through the baffle means and water reservoir and the air passes therethrough in a lateral undulating path or paths.

The present invention also provides a method of collecting or extracting dust from air utilizing apparatus as described above and comprising passing dust-laden air through baffle means and a water reservoir in a sinuous or tortuous path and thereafter passing the air through stripping means to remove residual water from the air.

It is desirable to arrange for the air emerging from the baffle means and the reservoir to separate from lateral curtains of water at the sides of the reservoir since this is a particularly efficient arrangement for cleaning the air.

Preferably, a fan or blower is used to draw or force the air through the apparatus.

The baffle means can be designed to constrain the air to reverse its direction of flow, some at least twice, and preferably three times, so that the air initially passes down into the water, reverses direction to pass up again, reverses direction to pass down again and finally emerges again in the upward direction. This promotes efficient cleaning or scrubbing of the air.

The stripping means preferably comprises a series of narrowly-spaced plates arranged as a grid to deflect the air flowing between the plates through a series of sharp angles. In this way, the successive deflections of the air as it passes through the stripping means forces the water to be deposited onto the plates from where it is allowed to drip back into the reservoir.

Preferably, the reservoir has means for draining off the sediment or sludge which forms at the bottom of the reservoir from time to time. To promote the efficient removal of the sludge, water can be periodically passed directly through the reservoir in a flushing operation.

The invention may be understood more readily and various other features of the invention may become apparent from consideration of the following description.

BRIEF DESCRIPTION OF DRAWINGS

An embodiment of the invention will now be described, by way of example only, with reference to the accompanying drawings wherein:

FIG. 5 is a side elevation of the scrubber unit of the apparatus.

DESCRIPTION OF PREFERRED EMBODIMENT

Figure 1:
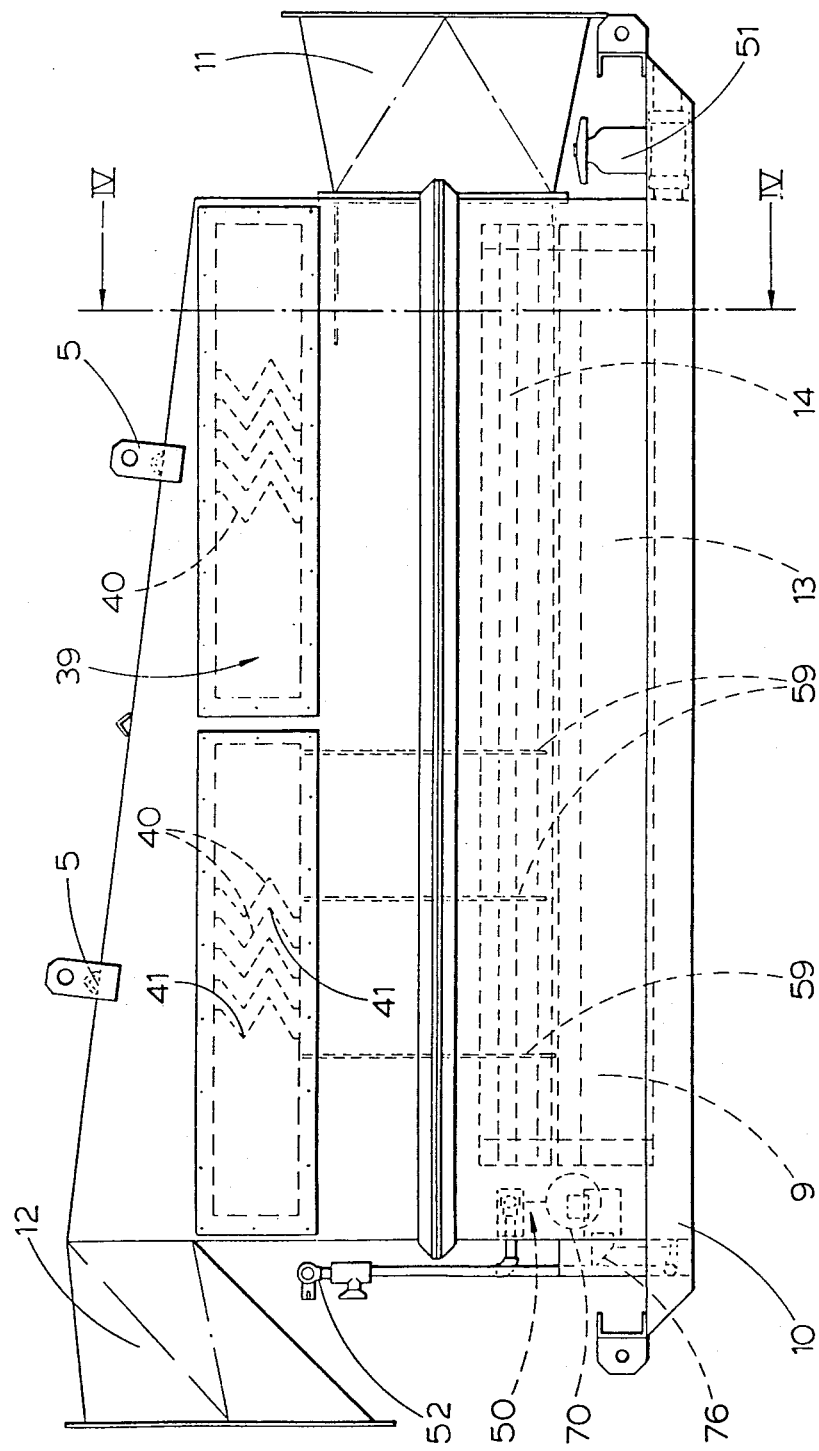
FIG. 1 is a side elevation of apparatus made in accordance with the invention.

As shown in the drawings, the apparatus has a base structure or a skid 10 which is preferably provided with a number of jacks (not shown) for adjusting the level of the apparatus. Brackets 5 are also provided to enable the apparatus to be suspended, for example, from a monorail. An inlet duct 11 is provided at one end of the apparatus and an outlet duct 12 provided at the opposite end. A fan (not shown) is provided, preferably at the outlet, to draw air through the apparatus from the duct 11 to the duct 12.

A water reservoir 13 is formed in a chamber 9 at the base of the apparatus.

Figure 4:
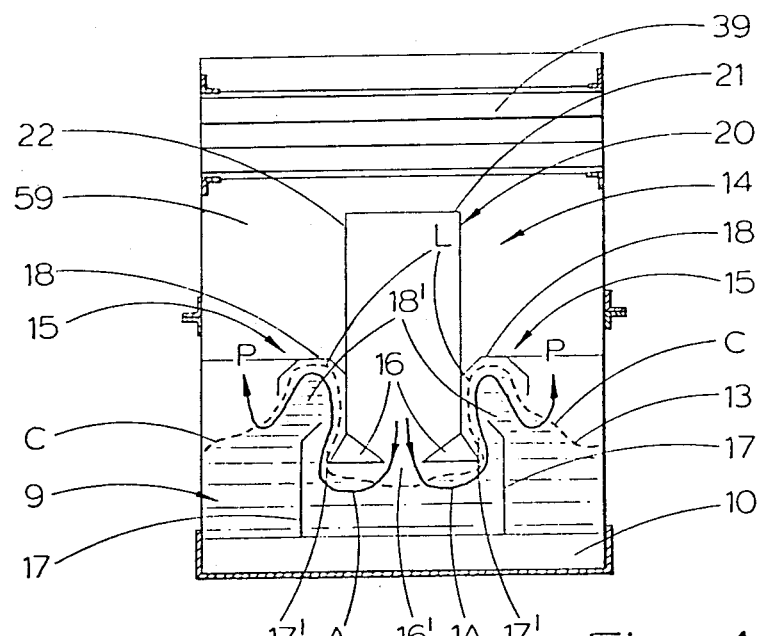
FIG. 4 is a cross-section taken along the line IV—IV of FIG. 1.

Within and above the water reservoir 13 is a scrubber unit 14 depicted in FIGS. 4 and 5. This scrubber unit 14 has a main channel 20 with a rectilinear side and upper walls 22,21 as shown in FIG. 4. This channel 20 communicates with the inlet duct 11. As shown in FIG. 5, the upper wall 21 of the channel 20 is tapered downwardly towards the water reservoir. This ensures that the air passed into the inlet duct 11 is guided progressively downwardly towards the water reservoir 13. The scrubber unit 14 additionally comprises baffle means 15. This baffle means 15 consists of wedge members 16 at the lower ends of the side walls 22 of the channel 20, upstanding plates 17 with inwardly-bent flanges mounted to the bottom of the chamber 9 and a further set of shaped plates 18 mounted to the exterior of the side walls 22 of the channel 20. The upper level of the water in the reservoir 13 is generally denoted by dotted lines L and the flow path of the air is generally denoted by the full lines A.

The members 16 define a gap 16' therebetween through which the dust-laden air is initially directed into the water in the reservoir 13. The members 16 also combine with the plates 17 to define a second set of gaps or channels 17' through which the air and water is allowed to rise. A final set of gaps or channels 18' is defined between the plates 18,17. The plates 18 serve to direct the air and water rising through the gaps 17' downwardly towards the sides of the reservoir 13 and the air separates from lateral curtains C of water extending over the length of the scrubber unit 14. The air is then allowed to rise at arrows P at the sides of the apparatus for further treatment.

The overall construction of the baffle means 15, as described, thus constrains the air to pass along a sinuous, tortuous path and, more particularly, the air flows through lateral undulating paths (as shown at A) without causing a great deal of turbulence of the water and air.

After the air has been forced through the water in the reservoir 13 and constrained by the baffle means 15 of the scrubber unit 14, it is allowed to rise into stripping means 39, mounted at the top of the apparatus. The stripping means 39 is designed to remove the residual water from the air. The stripping means 39 comprises a grid or framework of plates 40 bent in the manner as shown in the drawing (FIG. 1) so that the air passes successively through narrow angles 41 in the order of 30°–45°. The water is thus stripped from the air and deposited on the plates 40 from whence the water drips into the water reservoir 13.

A series of upstanding plates 59 extend across the apparatus and serve to guide the rising air into the stripping means 39. The plates 59 also inhibit undue turbulence of the air.

Figure 2:
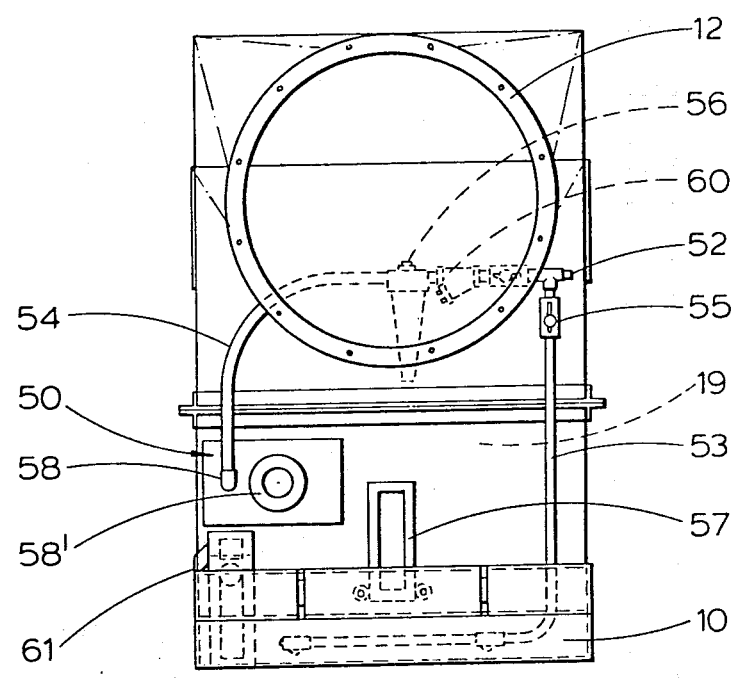
FIG. 2 is a end elevation of the apparatus as viewed from the outlet.
Figure 3:
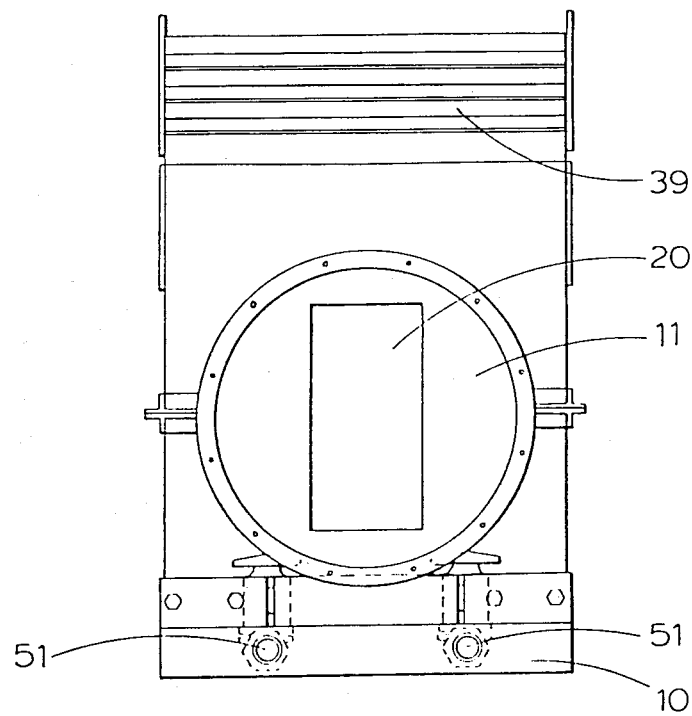
FIG. 3 is an end elevation of the apparatus as viewed from the inlet.

The sludge or slurry which builds up at the bottom of the water reservoir 13 can be flushed out from time to time by opening drain valves or cocks 51 (FIG. 3) which also permit the reservoir 13 to be emptied for other purposes. As shown in FIGS. 1 and 2, water is supplied to an inlet connection 52 and thence to flexible hoses 53,54. A stop cock or valve 55 is provided in the hose 53 and this hose 53 feeds nozzles at the floor of the reservoir 13 which are only used for flushing out the reservoir 13. In the other branch, i.e. hose 54, a pressure reducing valve 56 is provided and this hose 54 feeds control means 50 in the form of a float valve 70 which is damped with a dash pot 76 and serves to automatically charge the reservoir 13 with water whenever necessary to maintain a desired level. This level can be inspected visually with the aid of an inspection window 57. A further inspection door 58 and window 58' allow access and inspection of the control means 50. For safety purposes, an overflow pipe 61 is provided to drain off water which rises too high above the desired level. One or more filters, such as that indicated by reference numeral 60, can be incorporated in the water system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A dust extraction apparatus which comprises inlet means for receiving air carrying dust therein, a water reservoir, means for directing the air from the inlet means to said water reservoir having a main channel with side walls at least one of which is designed for shaping the water in said reservoir during use in cooperation with at least one additional plate so as to form an essentially static mass of water having an indulating shape with a curvilinear surface and for constraining the air to move through said mass of water in an extended sinuous or tortuous internal path such that the air enters the surface of said mass medially via one region and leaves the surface of said mass laterally via another region without creating significant spray or turbulence, and an outlet means for discharging the air after cleaning.

2. The dust extraction apparatus of claim 1 wherein said designed side wall comprises a vertical member having a lower end terminating as a flange positioned adjacent said additional plate which is an upstanding plate with an inwardly bent flange mounted to the bottom of said reservoir lateral to said flange portion of said wall member, said wall member further having an exterior flange projecting from the lateral surface thereof juxtapositioned above said upstanding plate.

3. The apparatus according to claim 2 wherein the path which the air takes through the water reverses its direction of flow at least two times as a result of said flanges.

4. The apparatus according to claim 1 further including a stripping means for stripping residual water from the air leaving the reservoir and prior to its discharge.

5. The apparatus according to claim 4 wherein said stripping means comprises a series of narrowly-spaced plates disposed above the water reservoir to receive air rising therefrom.

6. The apparatus according to claim 5 further including guide plates for guiding the rising air into said stripping means and for inhibiting turbulence of the air.

7. The apparatus according to claim 1 further including an impeller means for causing the air to flow through the apparatus from the inlet to the outlet means.

8. The apparatus according to claim 1 further including a draining means for draining off sediment deposited at the bottom of said reservoir.

9. The apparatus according to claim 1 further including a water-supply system with water-supply control means for automatically charging the reservoir to maintain a pre-determined quantity of water therein.

10. The apparatus according to claim 9 further providing an overflow path for draining off excess water from the reservoir.

11. The apparatus according to claim 9 wherein said water supply system is provided with at least one filter.

12. The apparatus according to claim 1 further supported on a base having jacks for adjusting the level of said apparatus.

13. A dust extraction apparatus which comprises inlet means for receiving air carrying dust therein, a water reservoir, outlet means for discharging the air after cleaning, an impeller means for forcing the air through the apparatus from the inlet means to the outlet means, means for directing the air from the inlet means to the outlet means through water in said reservoir, said air directing means including a main channel having side walls at least one of which is shaped in such a manner so as to cooperate with at least one additional plate to shape the water into a static mass having an undulating shape and guide the air through said static mass of water having an undulating surface, the air passing through the mass of water in an undulating path below said surface, said path entering the mass medially via a lower region of said surface and leaving the mass laterally without the creation of spray or turbulence via an upper region of the surface forming a lateral curtain of water in the reservoir.

14. The dust extraction apparatus of claim 13 wherein said shaped side wall comprises a vertical member having a lower end terminating as a flange positioned adjacent said additional plate which is an upstanding plate with an inwardly bent flange mounted to the bottom of said reservoir lateral to said flange portion of said shaped wall member, said wall member further having an exterior flange projecting from the lateral surface thereof juxtapositioned above said upstanding plate.

15. A dust extraction apparatus comprising inlet means for receiving air carrying dust therein, a reservoir containing water, elongate channel means for directing the air from the inlet means progressively towards the water in said reservoir, stripping means for stripping water from air rising from the reservoir, an outlet means for finally discharging the air after cleaning, said channel means having vertical side walls which cooperate with at least one additional upstanding plate to define lateral passages for guiding the air from the directing means through the water in the reservoir, serving to shape the water during use so as to produce an undulating upper surface of the water with a lower central region beneath the directing means, higher regions outside the directing means and outer lower regions between the higher regions and side walls of said reservoir forming water curtains wherein the passages of air following the undulating surface enter the water via the central surface region and pass through the water below the higher surface regions thereof to emerge from the lateral water curtains without significant spray or turbulence, at least one of said vertical side walls of said channel having a lower end terminating as a flange positioned adjacent said upstanding plate with an inwardly bent flange mounted to the bottom of said reservoir lateral to said flange of said wall, said wall further having an exterior flange projecting from the lateral surface thereof juxtapositioned above said upstanding plate.

16. A dust extraction apparatus comprising an inlet means for receiving air carrying dust therein, a water reservoir, a means for directing the air from the inlet means to the water reservoir, and outlet means for discharging the air after cleaning, said air directing means including a main channel having two vertical side walls, the lower ends of which terminate as flanges positioned adjacent upstanding plates with inwardly bent flanges mounted to the bottom of said reservoir lateral to said flanges at the lower ends of said walls, said vertical walls further having exterior flanges projecting from their lateral surfaces juxtapositioned above each upstanding plate, which shapes the water in said reservoir into a static mass and guides the air through said static mass of water to create an undulating surface, the air passing through the mass of water in an undulating path below said surface, said air entering the mass of water medially via a lower region of said surface and leaving the mass laterally without the creation of spray or turbulence via an upward region of the surface forming a lateral curtain of water in the reservoir.

17. A method of extracting air from dust which comprises passing air carrying dust therein through water in a reservoir, said reservoir being positioned between an inlet and an outlet, said air being directed from the air inlet to the water reservoir through a main channel having side walls which cooperate with at least one additional upstanding plate which shapes the water to form an essentially undulating shaped static mass and constrains the air to move through the mass of water in an extended sinuous or tortuous path such that the air enters the surface of said mass medially via one region and leaves the surface of said mass laterally via another region without creating significant spray or turbulence, at least one of said side walls of said channel having a lower end terminating as a flange positioned adjacent said upstanding plate with an inwardly bent flange mounted to the bottom of said reservoir lateral to said respective flange of said wall, said wall further comprising an exterior flange projecting from the lateral surface thereof juxtapositioned above said upstanding plate, and thereafter introducing the air leaving said water into a stripping means for removing residual water from said air.

18. The method of claim 17 wherein said channel comprises two vertical side walls, the lower ends of which terminate as flanges positioned adjacent corresponding upstanding plates with inwardly bent flanges mounted to the bottom of said reservoir lateral to said flanges at the lower ends of said side walls, each of said vertical side walls having exterior flanges projecting from their lateral surfaces juxtapositioned above each upstanding plate.

19. A dust extraction apparatus which comprises inlet means for receiving air carrying dust therein, a water reservoir, means for directing the air from the inlet means to said water reservoir having a main channel with side walls at least one of which is designed for shaping the water in said reservoir during use in cooperation with at least one additional plate, so as to form an essentially static mass of water with a curvilinear surface and for constraining the air to move through said mass of water in an extended sinuous or tortuous internal path such that the air enters the surface of said mass medially via one region and leaves the surface of said mass laterally via another region without creating significant spray or turbulence, said designed side wall comprising a vertical member having a lower end terminating as a flange positioned adjacent said additional plate which is an upstanding plate with an inwardly bent flange mounted to the bottom of said reservoir lateral to said flange portion of said wall member, said wall member further having an exterior flange projecting from the lateral surface thereof juxtapositioned above said upstanding plate wherein said flanges direct the air through the mass of water in two complimentary lateral extended sinuous paths, these paths leaving the mass of water via lateral curtains, each defining an upper region of the surface associated with the path, and an outlet means for discharging the air after cleaning.

20. A dust extraction apparatus which comprises inlet means for receiving air carrying dust therein, a water reservoir, outlet means for discharging the air after cleaning, an impeller means for forcing the air through the apparatus from the inlet means to the outlet means, means for directing the air from the inlet means to the outlet means through water in said reservoir, said air directing means including a main channel having side walls at least one of which is shaped in such a manner so as to cooperate with at least one additional plate to shape the water into a static mass and guide the air through said static mass of water to create an undulating surface, the air passing through the mass of water in an undulating path below said surface, said path entering the mass medially via a lower region of said surface and leaving the mass laterally without the creation of spray or turbulence via an upper region of the surface forming a lateral curtain of water in the reservoir, said shaped side wall comprising a vertical member having a lower end terminating as a flange positioned adjacent said additional plate which is an upstanding plate with an inwardly bent flange mounted to the bottom of said reservoir lateral to said flange portion of said wall member, said wall member further having an exterior flange projecting from the lateral surface thereof juxtapositioned above said upstanding plate, wherein said air is directed through the water mass by said flanges in a pair of lateral undulating paths, said air entering the water via a common lower region of the water surface and leaving the water surface via a pair of opposite lateral curtains of water.

* * * * *